United States Patent [19]

Baldi et al.

[11] 4,292,208

[45] Sep. 29, 1981

[54] DIFFUSION COATING COMBINATIONS

[75] Inventors: Alfonso L. Baldi, Wynnewood, Pa.; Victor V. Damiano, Pennsauken, N.J.

[73] Assignee: Alloy Surfaces Company, Inc., Wilmington, Del.

[21] Appl. No.: 687

[22] Filed: Jan. 3, 1979

Related U.S. Application Data

[63] Continuation-in-part of Ser. No. 781,134, Mar. 25, 1977, abandoned, and Ser. No. 755,738, Dec. 30, 1976, Pat. No. 4,157,705, each is a continuation-in-part of Ser. No. 576,981, May 31, 1975, Pat. No. 4,041,196, said Ser. No. 755,738, and Ser. No. 576,981, each is a continuation-in-part of Ser. No. 507,126, Sep. 18, 1974, abandoned, said Ser. No. 576,981, and Ser. No. 507,126, each is a continuation-in-part of Ser. No. 466,908, May 3, 1974, Pat. No. 3,958,047, said Ser. No. 507,126, and Ser. No. 466,908, each is a continuation-in-part of Ser. No. 328,378, Jan. 31, 1973, Pat. No. 3,867,184.

[51] Int. Cl.$^3$ .................. B01J 23/16; B01J 23/74; B32B 15/14
[52] U.S. Cl. ................... 252/470; 252/472; 428/607; 428/613; 428/682; 428/685; 148/31.5
[58] Field of Search ............... 428/680, 681, 613, 687, 428/933, 606, 607, 682–685; 252/466 BT, 470, 472, 467; 148/31.5

[56] References Cited

U.S. PATENT DOCUMENTS

| | | | |
|---|---|---|---|
| 2,094,117 | 9/1937 | Brykit, Jr. | 260/99.40 |
| 2,604,455 | 7/1952 | Reynolds et al. | 252/412 |
| 3,165,478 | 1/1965 | Hausehild et al. | 252/413 |
| 3,272,728 | 9/1966 | Hahndorff et al. | 204/35 |
| 3,352,769 | 11/1967 | Ruben | 428/613 |
| 3,408,230 | 10/1968 | Dickinson et al. | 136/25 |
| 3,408,231 | 10/1968 | Dickinson et al. | 136/29 R |
| 3,560,404 | 2/1971 | Jung et al. | 252/414 |
| 3,637,437 | 1/1972 | Goldberger | 136/120 FC |
| 3,764,371 | 10/1973 | Baldi | 428/668 |
| 3,846,344 | 11/1974 | Larson, Jr. et al. | 252/466 J |
| 3,900,602 | 8/1975 | Rummel | 427/115 |
| 3,939,097 | 2/1976 | Takeoka et al. | 252/464 |
| 3,978,253 | 8/1976 | Sahm | 428/667 |
| 3,980,445 | 9/1976 | Aleshin et al. | 428/613 |
| 4,043,945 | 8/1977 | Fukui et al. | 252/466 J |
| 4,049,580 | 9/1977 | Oden et al. | 252/466 J |
| 4,086,149 | 4/1978 | Martinsons et al. | 204/59 R |
| 4,169,025 | 9/1979 | Needer | 204/98 |
| 4,170,574 | 10/1979 | Inaba et al. | 252/472 |
| 4,171,669 | 10/1979 | Allen | 102/37.6 |
| 4,175,954 | 11/1979 | Oden | 75/138 |

FOREIGN PATENT DOCUMENTS

| | | | |
|---|---|---|---|
| 806618 | 2/1969 | Canada . | |
| 592130 | 9/1932 | Fed. Rep. of Germany . | |
| 1019361 | 11/1957 | Fed. Rep. of Germany . | |
| 1909031 | 9/1970 | Fed. Rep. of Germany . | |
| 2139774 | 4/1973 | Fed. Rep. of Germany | 252/472 |
| 2653394 | 11/1977 | Fed. Rep. of Germany | 428/613 |
| 282112 | 7/1929 | United Kingdom . | |
| 692300 | 6/1953 | United Kingdom . | |
| 1289751 | 9/1972 | United Kingdom . | |

OTHER PUBLICATIONS

Roth, et al., "Catalytic Dehydrogenation of Higher Normal Parafins", *I. & E. C. Product Research & Development*, vol. 7, pp. 252–253 (12/68).

Yasumura, J., et al., "New Method of Preparing a Nickel Catalyst", *I. & E. C. Product Research and Development*, p. 252.

Selman, G. L., et al., *Dispersion Strengthened Platinum* from *Platinum Metals Review*, Johnson Matthey, vol. 18, pp. 2–13, (4/74).

Groggins, P. H., ed., *Unit Processes in Organic Synthesis*, 4th edition, McGraw Hill, pp. 522–523 (1952).

*Kirk-Othmer Encyclopedia of Chemical Technology*, vol. 13, pp. 802–807.

*Chemical Week*, p. 85 (2/19/66).

Vielstich, W., Paper in *Chemie Ing. Techn.*, vol. 33, No. 2, pp. 75–79 (1961).

Yasumura, J., et al., "Laminated Raney Nickel Catalyst", *Ind. Eng. Chem. Prod. Res. Develop.*, vol. 11, No. 3, pp. 290–293 (1972).

*Primary Examiner*—Michael L. Lewis
*Attorney, Agent, or Firm*—Connolly and Hutz

[57] ABSTRACT

Diffusion coating a substrate metal with a different metal, such as aluminum and zinc, that is then chemically removed from the coated substrate, provides the residual metal with a very desirable catalytic surface. At least about a third of the removable metal can be dissolved out. Platinum wire screens activated in this way make effective exhaust catalysts for automotive engines. Chromium-rich coating for protective purposes can be applied on a superalloy, diffusion coating in a pack that in addition to the chromium to be diffused, also contains at least about 3% $Ni_3Al$. Also the formation of alpha-chromium is reduced when the pack diffusion is carried out in a retort effectively not over five inches in height. Pack aluminizing in the presence of chromium makes a very effective aluminum- and chromium-containing top coating over platinum plated or platinum coated nickel-base superalloys. Depletion of diffusible material from workpieces heated in a powder-pack can also provide a surface on which aluminizing produces a highly impact-resistant coating.

3 Claims, 7 Drawing Figures

DIFFUSION COATING COMBINATIONS

This application is in part a continuation of applications Ser. No. 781,134 filed Mar. 25, 1977 now abandoned and Ser. No. 755,738 filed Dec. 30, 1976, now U.S. Pat. No. 4,157,705 granted May 15, 1979 each of which is in turn a continuation-in-part of application Ser. No. 576,981 filed May 31, 1975 (U.S. Pat. No. 4,041,196 granted Aug. 9, 1977). Applications Ser. No. 755,738 and Ser. No. 576,981 are also continuations-in-part of prior application Ser. No. 507,126 filed Sept. 18, 1974 (subsequently abandoned), and applications Ser. No. 576,981 and Ser. No. 507,126 are continuations-in-part of still earlier application Ser. No. 466,908 filed May 3, 1974 (U.S. Pat. No. 3,958,047 granted May 18, 1976), while applications Ser. No. 507,126 and Ser. No. 466,908 are continuations-in-part of the very early application Ser. No. 328,378 filed Jan. 31, 1973 (U.S. Pat. No. 3,867,184 granted Feb. 18, 1975).

The present invention relates to the treatment of metal substrates in a combination of steps at least one of which is a diffusion coating operation.

Among the objects of the present invention is the provision of simple and effective techniques for producing metal surfaces that are catalytically activated or are protected against attack.

The foregoing as well as other objects of this invention will be more fully explained in the following description of several of its embodiments, reference being made to the accompanying drawings which illustrate the use of an active metal surface pursuant to the present invention, in a gasoline engine exhaust system. In those drawings.

Figure 1:
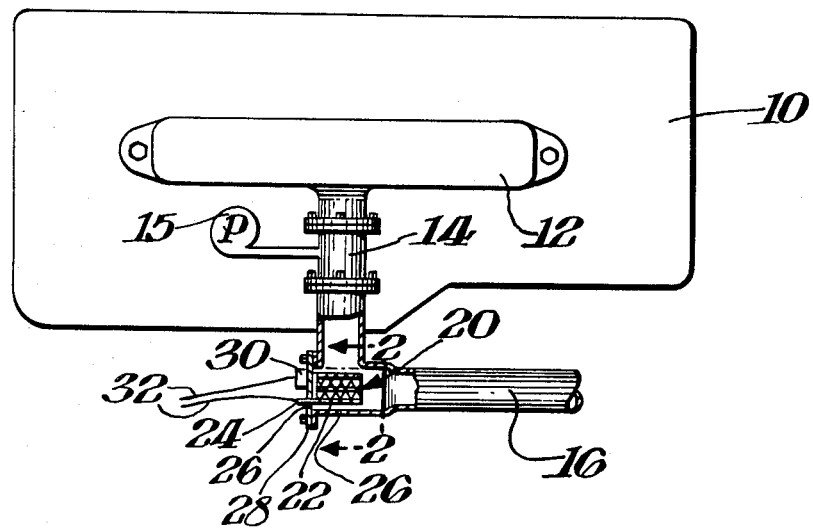
FIG. 1 is a side view, with parts broken away, of a gasoline engine incorporating the present invention.

According to the present invention a coherent body of metal such as nickel, platinum, palladium and iron is provided with a catalytically very active surface by diffusing into it at least about $\frac{1}{2}$ milligram, preferably at least about 5 milligrams, of aluminum or zinc per square centimeter, and then selectively dissolving out at least about a third of that aluminum or zinc.

The resulting self-supporting members have a surface that is porous and very highly active. In some cases, as shown in the working examples, such surface will spontaneously cause explosive reaction with the ambient air.

There have been suggestions along similar lines, as for instance in U.S. Pat. Nos. 2,583,619 and 3,846,344, British Patent No. 1,289,751 and its counterpart German Offenlegungsschrift No. 1,909,031, German Pat. No. 592,130 and the paper New Method of Preparing a Nickel Catalyst by Yasamura et al in I&EC Product Research and Development, December 1968, pages 252-54, but those suggestions have not been striking.

The coherent bodies of metal according to the present invention can be in the form of foil, wire, screening, ribbon, metal wool, sheets, perforated and/or fluted and/or dimpled foil or sheet, tubes, blocks or the like or even a honeycomb structure. The catalysts of the present invention have a very large surface area per unit volume. Where large surface areas are desired to be concentrated in one location the surfaces of the present invention can be formed on very fine wire, 0.5 mils thick for example, or on foil or ribbon of such small thicknesses or even thinner, that can be folded or crumpled into a compact mass, or on fine metal wool.

In general the surfaces of the present invention do not have to be over about 25 mils thick so that they can be formed on both sides of substrates 50 mils thick or thinner. They can also be formed on platings of the foregoing thicknesses coated on other substrates as by electroplating, electroless plating, vapor deposition, sputtering, etc.

Inasmuch as the surfaces of the present invention are on coherent bodies of metal, the entire mass of surface can be readily removed from a reaction container for cleaning, rejuvenation or the like, and then returned to the container or replaced by fresh catalyst. The catalysts of the present invention do not tend to wash away or float off, as powder does, and are particularly suitable for use in continuous processes. The coherent bodies of metal can also be used as an electrical and/or thermal conductor where such use is of some benefit to the process conducted with the surface.

The following examples illustrate the present invention:

EXAMPLE I

A 5 mil thick foil of pure nickel is aluminized in an ammonium-chloride-energized diffusion coating pack consisting of 20% aluminum and 80% alumina, the coating temperature being 1100° F. for 10 hours. The resulting coated surface of the nickel contains at least about 30% aluminum and when subjected to treatment by a 20% solution of caustic soda in water at 20° to 40° C., most of that aluminum is dissolved out and the dissolution reaction then stops of its own accord.

The activated nickel foil so produced can be kept under water until needed. At that time it is removed from the water and if left exposed to the air will begin to heat up as it dries. If used as a catalyst to hydrogenate soybean oil in accordance with the technique described on pages 522 and 523 of "Unit Processes in Organic Synthesis", P. H. Groggins, editor-in-chief, fourth edition, published 1952 by McGraw-Hill Book Company, it is fully effective. With a contact time of 15 seconds at a temperature of 130° C. and a hydrogen pressure of 100 atmospheres it causes substantial hydrogenation.

Before the leaching of the aluminum the aluminized foil is quite brittle and should be handled with care. The embrittling is less significant when thicker foil or sheets are aluminized.

Nickel wool, or nickel-plated iron wool or foil, can be aluminized instead of nickel foil to provide the catalytic nickel surface. The dissolving of the aluminum from the surface can be effected with any caustic including caustic potash and should be carried out at a temperature at or below the boiling point of the caustic solution used. The aluminized nickel can be stored as such for many months until just before catalytic use, the aluminum being then dissolved away to provide freshly formed catalyst.

Prolonged storage of the activated surfaces under water does cause gradual diminution in activity, particularly if the water is not cold. This gradual loss of activity is made even more gradual by having alkali present in the water, and storage under oil such as vegetable oil or even mineral oil, is particularly effective.

As indicated supra, the foregoing nickel catalysts are readily adapted to continuous processes such as the hydrogenation of oils or other materials, or even in polymerizations such as the thickening of paint vehicles. Thus a vegetable oil to be hydrogenated is conveniently flowed on a continuous basis through a mass of nickel screening activated in the foregoing manner, with agitation and under an atmosphere of hydrogen at about 60 to 100 pounds per square inch absolute, to provide good yields. Part of the catalyst mass is periodically removed and replaced by fresh catalyst, the removed catalyst being rejuvenated by additional leaching, or by a fresh diffusion and leaching treatment.

EXAMPLE II

A 200 mesh screen of 2 mils thick nickel wire was aluminized in the diffusion coating pack of Example I, the coating temperature being 1000°–1050° F. for twelve hours. Aluminum chloride was used to activate the pack rather than ammonium chloride and the resulting screen showed an aluminum pick-up of twelve milligrams per square centimeter. A portion of the aluminized screen was then leached with 20% aqueous NaOH until bubbling had essentially terminated, after which the leached screen was washed in tap water and placed on a table top. Upon drying a sharp explosion took place at the treated screen, apparently as a result of an extremely rapid oxidation reaction at the surface of the screen.

EXAMPLE III

Another sample of the 200 mesh screen of 2 mil nickel wire used to make the active material of Example II, was aluminized as in Example II but for only 10 hours, the resulting aluminum pick-up being 7 milligrams per square centimeter. A piece of the thus-coated screen was subjected to the leaching-out of aluminum as in Example II, was then also rinsed with tap water and placed on a desk top. It dried out without an explosion, but did begin to spontaneously get warm. It was then placed on a hot plate heated to 150° F. and after about a minute it too underwent an explosion.

For catalytic hydrogenation or any other catalytic reaction in which agitation is helpful, the catalytic surfaces of the present invention can be formed on, or attached to, a stirrer blade or the like, and thus simplify the carrying out of the process. Thus a 50 mesh screen cloth of 10 mil thick nickel wire can be wrapped around a propeller-type stirrer blade, spot welded in place, and then activated in accordance with the present invention. Alternatively the propeller blades can be made of nickel or can be nickel plated, and the nickel surface activated, although this does not provide as much total surface.

EXAMPLE IV

A pure platinum wire 20 mils in diameter and 5 cm in length, was aluminized in a powder diffusion coating pack consisting of 20% aluminum and 80% alumina, activated by the addition of 0.5% $AlCl_3$. The coating temperature was 1050° to 1100° F. for 10 hours, giving a weight pick-up of 8 milligrams per square centimeter. The resulting wire was coiled around a glass rod $\frac{1}{8}$ inch in diameter and leached for about 15 minutes in a 20% solution of NaOH in water, after which it was rinsed in tap water.

The rinsed wire, still coiled but removed from the rod, was held in the air and a stream of hydrogen gas was directed at it from a nozzle $\frac{1}{2}$ inch away. The wire began to heat up and in less than 30 seconds was hot enough to ignite the hydrogen. Replacing the hydrogen by a stream of propane caused the propane to become spontaneously ignited upon contact with the active platinum surface, providing that surface was at 240° F. or higher in temperature.

The platinum was permitted to cool after which it was inserted in 20 ml of 30% $H_2O_2$. Violent decomposition of the $H_2O_2$ began at once and in a few seconds the liquid had generated sufficient heat to bring its temperature to 212° F. This decomposition reaction stopped as soon as the platinum coil was removed from the liquid, and resumed when the coil was re-introduced into it.

The active platinum coil was then inserted in a boiling aqueous solution of 2% oxalic acid and 2% sodium chlorate. A reaction ensued with the violent liberation of carbon dioxide. In the absence of the active platinum no significant reaction takes place, and even the addition of non-activated platinum did not cause significant reaction.

The coiling of the platinum before the leaching tends to crack and spall the aluminum-diffused surface, a tendency that is accentuated as the concentration of diffused-in aluminum increases. Unless the coiling is minimized to avoid spalling it is preferably effected after the leaching.

EXAMPLE V

A test bar of B-1900 superalloy containing a 0.5 mil thick palladium electroplating was aluminized in a diffusion coating pack containing 10% aluminum, 45% chromium and 45% alumina activated by the addition of 0.5% $NH_4Cl$. The coating temperature was 1950° F. for 10 hours, producing an aluminum pickup of 10 milligrams per square centimeter. The resulting bar was leached in hot concentrated (37%) hydrochloric acid for 15 minutes with considerable gassing. The leached bar was then rinsed in tap water and immersed in 30% $H_2O_2$. Oxygen gas began to be very rapidly evolved and the liquid rapidly warmed up.

The B-1900 alloy is a nickel base material containing

| | |
|---|---|
| C | 0.1% |
| Mn | 0.2% max |
| Si | 0.25% max |
| Cr | 8% |
| Co | 10% |
| Mo | 6% |
| W | 0.1% max |
| Cb | 0.1% max |
| Ti | 1% |
| Al | 6% |
| B | 0.015% |
| Zr | 0.08% |
| Fe | 0.35% max |
| Ta | 4.3% |

| | -continued |
|---|---|
| S | 0.015% max |

EXAMPLE VI

A test bar of B-1900 superalloy having a platinum electroplate 0.3 mil thick was aluminized by the process described in Example V, producing an aluminum pick-up of 8 to 9 milligrams per square centimeter. The aluminized platinum-plated bar was then leached in boiling 20% aqueous NaOH for 20 minutes, washed in tap water and placed in 30% $H_2O_2$. Oxygen was rapidly evolved and in four minutes the temperature of the liquid reached 200° F.

EXAMPLE VII

Another B-1900 test bar with a 0.3 mil platinum electroplate was aluminized as in Example VI and then heated in air at 2000° F. for 200 hours. After this treatment the surface of the bar was resistant to the action of aqueous NaOH even in high strengths and at boiling temperature. However concentrated hydrochloric acid leached out aluminum fairly readily at 160° to 200° F. The leaching solution, originally colorless, became yellow during the leaching, indicating that a very small quantity of platinum may have also dissolved in it. After ten minutes treatment in the leaching acid the leached bar was removed, rinsed in tap water and placed in 30% $H_2O_2$. A very violent generation of oxygen began and the liquid became quite hot.

The catalytic surfaces of the present invention can be formed with increased activity by bubbling hydrogen over them as they are rinsed after the leaching operation. This increase in activity takes place notwithstanding the fact that considerable hydrogen bubbling has already occurred during the leaching step. Such supplemental hydrogen bubbling also brings up the level of activity of the surfaces of the present invention after they have begun to deactivate, as for example after substantial use to decompose $H_2O_2$. The surfaces are also increased in activity when the leaching is carried out in two steps, one by alkali such as NaOH or KOH, and the other acid such as HCl or $HNO_3$. This technique is particularly effective with platinum.

Leaving about 5% or less of aluminum or zinc in the platinum or other active surface pursuant to the present invention, provides a particularly desirable catalytic surface. Also by leaching out at least half of the aluminum or zinc or other diffusion-introduced metal, the resulting catalytically active surface becomes extremely porous and exceedingly active.

EXAMPLE VIII

An 18 mesh screen of iron wires 20 mils in diameter was aluminized by the process described in Example III, causing it to pick up 8 milligrams of aluminum per square centimeter. A one inch by one-half inch portion of the coated screen was cut off and leached in 20% aqueous NaOH for about 30 minutes, washed with water and placed on a sheet of paper. A few seconds after the washed portion dried out it spontaneously heated up and scorched the paper on which it had been placed.

EXAMPLE IX

A piece of 20 mil thick sheet of thoria-dispersed nickel containing 2% $ThO_2$ was subjected to pack diffusion in a pack consisting of 20% powdered aluminum and 80% alumina, activated with ½% aluminum chloride. The diffusion temperature was 1000° to 1050° F. for 12 hours, and the aluminum pick-up was 26.2 milligrams per square centimeter. The resulting material on leaching in boiling 15% aqueous caustic leaves an active nickel surface.

EXAMPLE X

A 50 mesh screen of nickel wire 20 mils thick, which wire carried a 0.5 mil thick electroplated platinum coating, was subjected to a diffusion coating in a pack consisting of 15% aluminum and 85% alumina activated by the addition of 0.5% aluminum chloride. The coating temperature was 1050° F. for 10 hours giving a weight pick-up of 9 milligrams per square centimeter. The resulting screen was then boiled in 25% caustic soda solution for 15 minutes, after which it was rinsed in tap water. The rinsed product after drying ignited a stream of propane upon heating to 280° F.

EXAMPLE XI

Zinc was diffused into a 50 mesh screen of 20 mil thick nickel wire, by imbedding a length of such screen in a pack consisting of 10% powdered zinc and 90% powdered alumina, activated with ½% ammonium chloride. The diffusing conditions were 800°–850° F. for 10 hours, providing a zinc pick-up of 133 milligrams per square centimeter. The material so produced was leached with 20% aqueous caustic at 150° F. to provide an active nickel surface.

The leaching steps used according to the present invention do not have to remove all the removable metal that has been diffused into the surface. Indeed in most of the foregoing exemplifications at least a small amount of the aluminum or zinc is still in the active surface. At least about ⅛ is removed to obtain a high order of activity. Leaving some of the removable metal unleached is also desirable in that this enables the surface to be reactivated by another leaching step after it loses activity. About 0.5% to about 10% content of the diffusion metal, based on the weight of the metal into which it is diffused, makes a very suitable range. In addition to the leaching materials given above others such as sulfuric acid can be used, preferably in hot dilute condition. A low-boiling diffused-in metal like zinc can also be partially removed by vacuum evaporation, but this is not as effective.

The maximum amount of removable metal diffusing into the surfaces will depend on the nature of the metals involved. Thus when aluminum is the diffusing metal it is undesirable and unnecessary to diffuse in more than about 30 milligrams per square centimeter of surface, particularly into nickel. On the other hand zinc diffuses in more readily and as much as 150 or more milligrams can be readily diffused into nickel, per square centimeter. In general pick-ups of more than about 100 milligrams per square centimeter do not significantly increase the activity of the final surface.

The diffusion of the present invention need not be conducted with a pack. The diffusing metal can be applied to the surface being prepared by gas plating, vapor condensation, electroplating, dipping in molten diffusing metal, molten metal spraying, rolling in powdered diffusing metal, electroless plating and even sputtering, so long as the surface so coated is subjected to diffusion temperatures for an adequate period of time. It is somewhat simpler however to apply the diffusing metal to the surface being treated and to diffuse it into that surface in a single sequence as in pack diffusion, gas plating diffusion or dipping in molten diffusion metal. Thus molten zinc covered by a protective flux such as zinc ammonium chloride can be held at 800° to 900° F. and the surfaces being treated can be immersed in this molten zinc for two to ten hours.

Pack diffusion is however a much preferred technique. A single pack diffusion produces in a single step a product ready for leaching without leaving the surface of the product coated with a layer of excess diffusing metal. Such excess must be removed in the leaching and does not contribute to the activation. The diffusing metal content of the powder pack is generally not exhausted by a pack diffusion, but the pack can be re-used and depletion of diffusing metal from it is easily made up by adding some of that metal to the used pack.

A feature of the present invention is that the coherent forms of active surface are good conductors of heat and electricity. By mounting the entire surface on a heat sink such as a large mass of relatively cool metal, the active surface can be kept from excessive heat-up as it catalyzes a reacton. Similarly by connecting the active surface to a source of heat or of electricity, it can be preheated where this helps it to catalysze, or begin to catalyze, a reaction. Also the temperature of the active surface can be monitored by observing the electrical resistance of the coherent bodies on which they are located inasmuch as those bodies have electrical resistivities that increase with temperature.

FIGS. 1 through 4 of the drawings show such an embodiment of the invention. An automobile engine 10 is here illustrated as having its exhaust manifold 12 connected through an air insertion link 14 to exhaust pipe 16. An air pump 15 delivers a small amount of air to the exhaust gases to help them complete their combustion in the exhaust system.

In the exhaust pipe 16 there is positioned an exhaust catalyst 20 pursuant to the present invention. This catalyst is a 50 mesh screen 22 of 4 mil platinum wire wound over a series of Inconel 600 posts 24 and spot welded or brazed to them. The posts are carried by an insulating disc 26 of ceramic or polytetrafluoroethylene that is in turn bolted to a flange 28 on the exhaust pipe. The posts to which the ends of the screen are secured are connected by leads 32 shown only in part, to the battery with which the engine operates, by way of a control 30 that responds to the temperature of the exhaust at the catalyst location, to turn battery current through the screen when the engine is running and that temperature is below about 280° F. Such a control is conveniently carried by the disc 26.

In place of the Inconel posts 24 there can be used posts of other materials such as 18-8 stainless steel or Incology 800, or any other metal that satisfactorily withstands the conditions in the exhaust system. Screen 22 can also be replaced by a screen of platinum wire 1 mil in diameter, or even by a foil. In any of these arrangements the screen or foil is located in an enlarged portion of the exhaust pipe if it is noted desired to obstruct the flow of exhaust gases. Also by mounting it in the manner illustrated, it is a simple matter to remove the entire catalyst, subject it to a rejuvenation treatment as by the action of aqueous caustic or hydrochloric acid or nitric acid, at temperatures ranging from room temperature to normal boiling temperatures, or by repeating the diffusion and leaching and to then reinstall the catalyst. In the event the catalyst is not fit to restore to service, it can be readily salvaged as by dissolving it completely in aqua regia, or by anodically electrolyzing it in a platinizing electrolyte. This ease of rejuvenating and salvaging sharply reduces the cost of using the catalysts of the present invention, and for large quantity use such as in automobiles, puts much less strain on the world's resources of platinum. If desired the catalyst before salvaging can be broken loose from the posts on which it is mounted.

The catalysts of the present invention can also be in the form of screens mounted in shape-retaining frames, as in window screen constructions, and slipped into positioning grooves provided in the automobile exhaust pipe or other equipment in which the catalytic reaction is conducted. Mounted or unmounted screens are desirably woven with palladium wires interspersed amoung the platinum wires, inasmuch as this increases the cost-efficiency of the catalyst. A similar increase is obtained if the wires are made of palladium-platinum alloys containing 10 to 90% of platinum.

The platinum catalyst tends to also produce sulfuric acid in the exhaust arrangement of FIG. 1. Such sulfuric acid can be trapped by a porous canister of powdered BaO, CaO, $CaCO_3$ or similar chemical placed in the exhaust pipe 16 downstream of the catalyst. Alternatively the sulfuric acid can be collected as by a sintered ceramic disc placed in an enlarged portion of the exhaust pipe so as to cause the exhaust to pass through the disc. The acid will then drain down into a ceramic holder where it can accumulate and from which it can be emptied periodically. Either of these embodiments can be arranged to provide a small by-pass path through which the exhaust can pass without obstruction so that carbon, rust and other solid materials in that exhaust can find their way out. Alternatively the trapping members can be made readily removable so that the exhaust pipe can be frequently purged, or the exhaust pipe upstream of the trapping members can be made of material such as 18-8 stainless steel, that does not produce many loose particles of corrosion products.

The air pump 15 is not essential to the use of the present invention. Thus the engine can be operated with a very lean fuel mixture, as described for example in U.S. Pat. No. 3,447,516 granted June 3, 1969, and under these conditions the exhaust will contain a significant amount of oxygen which is not consumed by the principal combustion in the engine. This oxygen will then be used to burn up residual amounts of unburnt or partially burnt fuel ingredients present in the exhaust.

The active platinum surfaces of the present invention make very good igniters for hydrogen and the like, and can accordingly be used wherever such ignition is needed. One such use is to ignite the hydrogen which is passed through a diffusion coating retort as described and illustrated in U.S. Pat. No. 3,801,357, for the purpose of providing a hydrogen atmosphere for the diffusion coating. To this end it is convenient to have a small piece of platinum screen such as that of Example X held by a flexible arm adjacent the hydrogen outlet of such a furnace so it can be readily moved over to the outlet and effect ignition.

Similar ignition arrangements can be provided for igniting acetylene used in oxyacetylene welding, as well as lighting methane and similar gases in domestic gas use for cooking, hot water heating, and home heating in general, although for such uses the platinum surfaces of the present invention, or the gas, should be preheated.

The coherent bodies of the present invention can be provided in configurations other than described above. They can for instance be in the shape of baskets made of folded screen cloth spot welded to hold them in shape. Such baskets can be conveniently agitated in the body of liquid in which the desired catalytic reaction is to take place. Where a solid reactant takes part in the reaction, the solid can be held in such a basket.

It is preferred to start with catalyst metals that are very pure, although such metals containing as much as 2% of impurities and as much as 50% of alloying metals are usually also effective, particularly where the alloying metal is a promoter. Some alloying metals reduce the pyrophoricity of the activated surface. Thus when activating an alloy of iron containing a substantial proportion of chromium, the resulting activated surface has markedly reduced or no pyrophoric character, although the corresponding activation of plain carbon steel yields a product as pyrophoric as described in the foregoing Example VIII.

This is illustrated in the following Example.

EXAMPLE XII

A 10 mil thick sheet of type 410 stainless steel—which contains about 17% chromium—is aluminized by diffusion coating in a powder pack containing 20% powdered aluminum and 80% powdered alumina, activated by ½% anhydrous $AlCl_3$. The diffusion treatment is at 1000°–1050° F. for ten hours.

The resulting aluminized sheet is dropped into a 20% aqueous solution of NaOH to leach out the aluminum. After about 30 minutes of vigorous reaction by the caustic, gassing almost ceases, and the leached sheet is removed and rinsed. It shows a weight loss of about 1.7 milligrams per square centimeter and does not warm up or generate heat when dried and exposed to the air.

Although no pyrophoricity is exhibited by the activated sheet, it causes very vigorous decomposition of $H_2O_2$ solutions. It is even more effective for $H_2O_2$ decomposition than a correspondingly activated plain carbon steel sheet.

The activated stainless steel sheet can be treated with 15% by weight aqueous $HNO_3$, after which it will again react with 20% aqueous NaOH and then again very actively decompose $H_2O_2$.

Similar results are obtained with type 304 stainless steel, containing about 18% chromium and about 8% nickel, as well as with other stainless iron alloys.

Catalytic metals other than those named above can also be prepared by the process of the present invention, and in addition other readily leached out alloying metals can be used in place of the aluminum. Magnesium, tin and cadmium are examples of other metals that are readily leached out with hydrochloric or nitric acid. When preparing catalytic iron, neither aluminum nor zinc is suitable for use as the diffusing metal to be leached out by an uninhibited acid like hydrochloric acid inasmuch as the iron would also be attacked by the leaching acid. The same difficulty is experienced with other catalytic metals such as nickel that dissolve in acids.

The catalytic surfaces of the present invention are porous but are more effective than porous surfaces produced by simple etching for example. Thus the surface of platinum etched in dilute aqua regia seems to only become roughened rather than porous and is not nearly as active as the surfaces of the present invention. Also the surfaces of the present invention seem to withstand high temperatures better, a characteristic of some importance in automotive exhaust use. A 24-hour exposure of the platinum catalyst surface of the present invention to 1300° F. in air will, for instance, not detract significantly from its activity.

Figure 3:
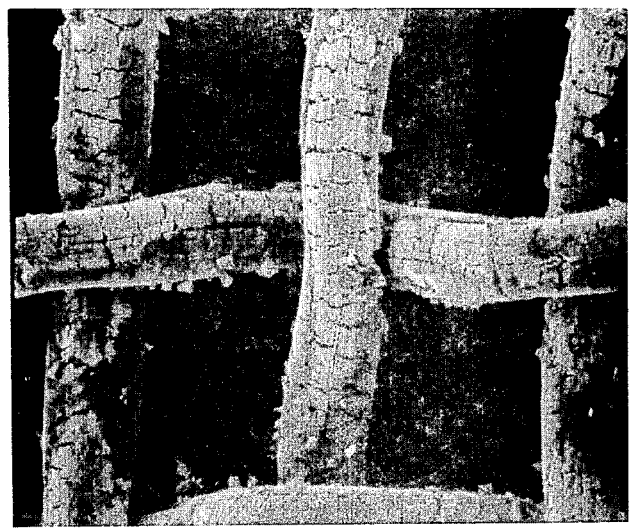
FIG. 3 is a scanning photomicrograph of a platinum screen according to the present invention, showing it enlarged 100 times.
Figure 4:
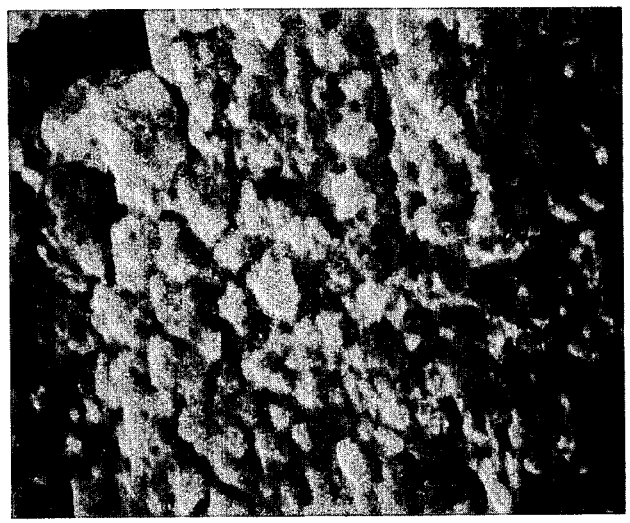
FIG. 4 is a scanning electron photomicrograph of the screen of FIG. 3, showing it enlarged 10,000 times.
Figure 5:
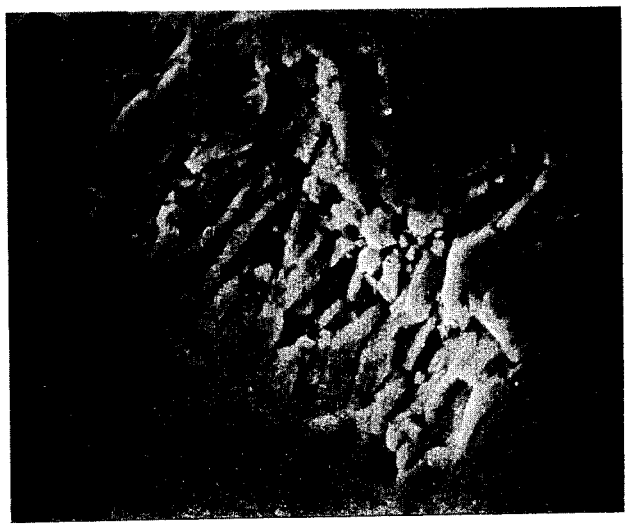
FIG. 5 is a scanning electron photomicrograph of a section of a platinum coating of the present invention on a substrate, showing the platinum enlarged 10,000 times.

The coherent platinum of the present invention has a striking structure illustrated in FIGS. 3, 4 and 5. In FIG. 5 the platinum coating is the micro-fissured layer 40, and as shown in this figure as well as in FIG. 4 the micro-fissured structure is three dimensional, extending throughout the depth of the layer. The overall structure is considered best described as fragmented into small cells, as well as fissured. These cells principally range from about 500 Angstroms to about 5000 Angstroms in size, that is in their largest dimensions.

The surface of a nickel catalyst, made pursuant to the present invention and examined after the surface explosion that takes place upon exposure to air, shows a similar structure, even though that surface takes on a brown color as a result of the explosion. Activated iron also has such a structure after its pyrophoric action is dissipated.

Platinum activated in the foregoing manners is very effective for all processes catalyzed by platinum metals. For example it works well in the decomposing of nitrogen oxides as for oxidizing carbon monoxide, hydrocarbons and ammonia. Thus a stream of nitrogen containing 2000 parts per million of higher nitrogen oxides as well as 1% CO, will show no significant nitrogen oxide content after passing through a 0.2 inch thick pile of platinum wire screens (60 mesh, 4 mil wire activated in accordance with Example IV) at essentially atmospheric pressure and an hourly space velocity of 125,000, when the gas stream before contacting the first screen has a temperature of about 230° C. or higher. The hourly space velocity is the volume of gas flowing per hour divided by the gross volume occupied by the screens. Decreasing the contact time by reducing the number of screens diminishes the effectiveness slightly, but even with only 5 screens in place and at an hourly space velocity of 475,000, about half the nitrogen oxides is removed at 230° C., more than 75% is removed at 250° C., and over 90% removed at about 300° C. The so-called "light-off" temperature for this treatment, with any number of screens, is about 200° C.

The oxidation of CO in a similar stream of nitrogen containing only 1% CO and 1% $O_2$ is even more effective. With the 19 screens and the same gas velocity no CO is detected in the outflow gas when the inflowing gas mixture is at a temperature as low as 210° C. A temperature of about 255° C. is needed for this result when 5 screens are used, that is when 14 of the 19 screens are removed. For this oxidation the light-off temperature is a little below 200° C.

The foregoing screen material also exhibits a light-off temperature of 200° C. for oxidizing propane in a 0.13% concentration in nitrogen containing 0.88% oxygen. Nevertheless with 19 screens about 80% conversion of the propane is effected at 230° C. and about 96% at 310° C. The light-off temperature for burning methane in air, with the foregoing screens, is about 450° F.

It should be noted that when the gas velocities are smaller the various catalytic conversions are more complete and can be effected with fewer screens. Thus even a single platinum screen activated in accordance with the present invention is a very effective exhaust cleanup device for automotive engine exhaust systems when the engine is operating at low speeds or idling. Also for higher or even maximum engine operating speeds a single activated platinum screen of the present invention is very desirably combined with other exhaust catalyst devices, such as a silica-supported film of platinum-palladium alloy, to improve the cleanup effectiveness. Because of the low light-off temperatures of the catalysts of the present invention it is preferred to have the platinum screen of the present invention at the upstream end of the catalytic combination. Such a single screen can have a mesh of from about 10 to about 300 wires per inch, with the wires varying in thickness from about one mil or less to about 10 mils.

The wires can have a square or other non-circular cross-section to thus increase their surface area. Also the wires need not all be identical. A single screen can have wires of different thickness, different cross-section, and different composition. Palladium is a desirable addition to a platinum exhaust catalyst and some of the wires can be of palladium or palladium-platinum alloy. Rhodium is also helpful as a platinum alloying ingredient for strengthening purposes and some or all of the platinum wires can be alloyed with 10 to 30% rhodium before activation. Iridium is also suitable for the same purposes and in the same proportions. Platinum is also strengthened with dispersed oxide such as zirconium oxide, as described by G. L. Selman et al in Platinum Metals Review, April 1974, pp. 2–13, and such dispersion-strengthened platinum also makes very active catalyst when activated pursuant to the present invention. Both the rhodium-alloyed platinum and the dispersion-strengthened platinum are given the coherent three-dimensional micro-fissured fragmentation structure having fragmentation cells principally ranging from about 500 Angstroms to about 5000 Angstroms in size, as described above. It should also be noted that the activating action, particularly for the platinum-rhodium alloys, is improved when using leaching solutions at high temperatures, such as under boiling conditions at atmospheric pressure.

All of the active platinums described above also contain pores less than 100 Anstroms in width and in a density of $10^8$ or more, generally $10^9$ or more, pores per square centimeter of gross surface. The gross surface is the outermost surface of the mass of platinum measured with a ruler, ignoring all the fissures and fragmentations. Where the platinum is in the form of a wire having a circular cross-section, its gross surface is the product of the wire length and pi times its diameter. The pores are more clearly shown in the FIGS. 6 and 7.

Figure 6:
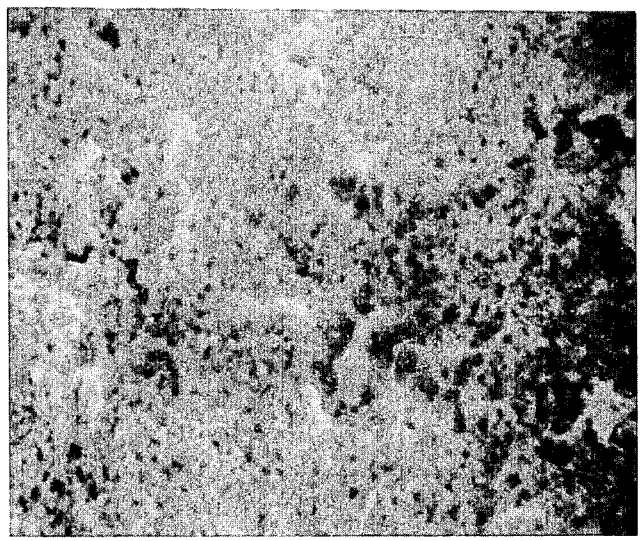
FIG. 6 is another 10,000 time enlargement of a scanning electron photomicrograph of a platinum surface of the present invention, made with the help of aluminizing.
Figure 7:
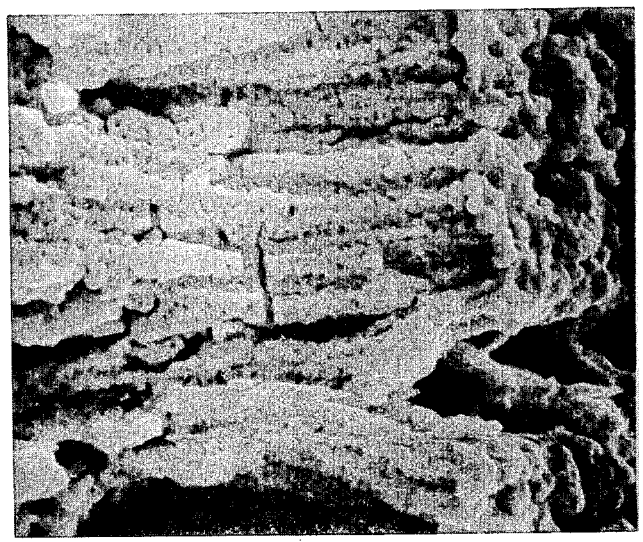
FIG. 7 is a 10,000 time enlargement of a scanning electron photomicrograph of a different platinum surface of the present invention, made with the help of a zinc diffusion.

The platinum of FIG. 6 was prepared as described in Example IV, the original platinum being a 60-mesh screen of wires having a circlar cross-section and 4 mils in diameter. The platinum of FIG. 7 was made from another portion of the same original screen using the processing procedure of Example XI.

The activated strengthened platinums of the present invention are also particularly well suited for catalyzing large-scale HCN production from ammonia-air-hydrocarbon combustion as described in U.S. Pat. No. 3,215,495 for example, where catalytic platinum screens can be as much as six or more feet in diameter and are operated at temperatures over 1100° C. Because the screens of the present invention are so highly active, the ignition of the HCN-forming gas stream occurs rapidly without necessitating an induction period for the thermal roughening of the surface as is the practice in the prior art. It is thus practical to use one or more fresh screens of pure platinum or platinum alloyed with 10% rhodium activated pursuant to the present invention as the first or top screen, combined with one or more unactivated or used screens downstream of it to make an effective catalytic screen combination giving high HCN yields right from the start.

The activated platinum of the present invention, either pure or hardened as above with rhodium or by dispersion-strengthening, is also very effective for oxidizing ammonia to nitric acid as described in Kirk-Othmer Encyclopedia of Chemical Technology, 2nd edition, Vol. 13, pp. 802–807, as well as Chemical Week, Vol. 98, pp. 85ff (Feb. 19, 1966), and U.S. Pat. No. 3,873,673, and ignites a hydrogen stream in air at as well as below room temperature. These catalysts make very effective igniters for hydrogen-oxygen rocket jets in space vehicles. Hydrogen peroxide jets for such vehicles are also improved by these catalysts, and they ignite a stream of propane in air at temperatures as low as 240° F.

The platinum or nickel catalysts of the present invention can also be used in the methanation of coal or carbon dioxide by hydrogen. Thus coal can be reacted with steam to form carbon monoxide and the resulting carbon-monoxide-containing product reacted with excess hydrogen by passing a mixture of these materials through a set of nickel screens activated pursuant to the present invention.

The high effectiveness of the catalysts of the present invention in igniting hydrogen makes them well suited for igniting the fuel in the combustion chambers of hydrogen engines, and for combatting flame-out conditions. For this purpose the hydrogen nozzles in the combustion chambers can have their tips made of the activated platinum of the present invention in tubular form for example. The activated platinum can additionally or alternatively be formed as portions of the combustion chambers or cans.

Other specific processes in which the activated platinum metals of the present invention are effective include polymerization and cracking of hydrocarbons, the combination of $H_2$ with $Cl_2$ to make HCl, and the oxidation of ethanol vapors to acetic acid.

The catalysts of the present invention are also particularly suited for catalytic or so-called "flameless" burning to provide heat. The burning of propane, for example, in this way can be actuated by electrical ignition to bring to operating temperature a wire or small screen of the activated platinum of the present invention, after which the wire or screen will maintain the combustion. Methane and even city gas can also be catalytically burned in this way, although a somewhat higher ignition temperature is needed for such gases.

Alloying the platinum of the present invention with palladium in amounts up to 30% also provides the highly effective catalysis of the present invention in the foregoing uses. The platinum-palladium alloys as well as the platinum-rhodium alloys readily receive a diffusion of aluminum or related metals, and aqueous caustic soda or caustic potash, or hydrochloric acid either by itself or as a follow-up treatment, dissolves out the metal that diffuses in. Where the catalysts of the present invention are used at high temperatures, e.g. at 700° C. or higher, it is preferred to leach out as much as possible of the metal that is diffused in. To this end it is helpful to use more than one leaching step and to alternate caustic and acid leaches.

Another typical activation treatment is as follows:

EXAMPLE XIII

A group of circular 60 mesh 4 mil platinum wire screens 3 feet in diameter is loaded into a 6 inch deep diffusion retort made of plain carbon steel by first pouring into the retort a one-half inch layer of aluminizing pack, then placing a screen over that layer, pouring an additional ¼ inch layer of pack over the screen, placing a second screen over the last layer, and repeating the alternate ¼ inch pack and screen layers until 18 screens are in the retort. An extra 1 inch top layer of pack is applied over the packed stack and $AlCl_3$ energizer then sprinkled over that top layer. The pack is a mixture of 20 weight percent powdered aluminum and 80 weight percent powdered alumina, and the energizer is applied in an amount 0.5% by weight of the foregoing mixture. A plurality of such loaded retorts are then placed within a tall outer retort through which hydrogen can be flushed as shown and described in U.S. Pat. No. 3,801,357, and the assembly heated in a furnace so that the contents of the retorts reach 800°–850° F. where they are held for 10 hours, after which the furnace is shut off and the retorts permitted to cool to 400° F., the flushing gas stream stopped, the retorts opened and unloaded. The coated screens thus made are then dropped into a 20 weight percent solution of caustic soda in water where they are kept overnight. After about 16 hours in such solution all traces of bubbling are dissipated, the solution is back to room temperature and the screens are then removed, washed with water and ready for use.

The described screens can also be further subjected to acid leaching as by dropping them in 37% aqueous HCl held at 70° C. and kept there for about 1 minute or less—preferably only a few seconds, followed by washing with water. Such a final acid leaching is also helpful when applied after the caustic leaching of Examples IV, V, VI and VII, as well as whenever a catalyst is prepared from a metal of the platinum family (platinum, palladium, rhodium, iridium and ruthenium). It is not helpful when preparing a catalyst from a metal that is readily attacked by the acid. A particularly desirable technique is to leach with caustic until no more leaching takes place, and then to apply the acid final leach with HCl or $H_2SO_4$. Acid treatment following a caustic leach tends to reduce the pyrophoricity of the resulting catalyst.

Large very active screens, such as those 6 feet in diameter, are readily made by securing together as by patch weaving, a plurality of smaller screens.

Instead of activating the platinum metal in the form of screens, it can be activated in the form of ordinary wire, as by diffusion coating loose coils of such wire packed in the foregoing diffusion coating pack in the same retorts, or by submerging such coils in a body of molten aluminum or zinc for about 8 hours, keeping the molten metal just above its melting point. The diffusion coated coils are then leached to dissolve out the aluminum or zinc. The thus-activated wire can then be woven into ordinary screens or coiled into flat spirals and braced with a few extra cross wires woven through the turns of the spiral.

In the foregoing examples, the activated pack diffusion was conducted at low temperatures, except for the platinum-plated substrates of Examples V, VI, and VII.

Pyrophoricity of the activated catalysts of the present invention is also reduced or completely eliminated by treatment with $H_2O_2$ or by subjection to evacuation. Such $H_2O_2$ treatment is accompanied by active heat generation, and is accordingly best conducted with very dilute solutions of $H_2O_2$, particularly where a large mass of catalyst is treated. These treatments indicate that nascent hydrogen is adsorbed on the active catalyst surface, and is removed by the treatment. In the interest of safety the treatment to reduce or eliminate pyrophoricity can be effected immediately after the caustic leach.

Turning now to the protection of metals against attack, it is known that superalloy articles such as turbine vanes and blades as well as burner rings in the hot section of jet engines can be diffusion coated with chromium and then diffusion coated with aluminum to improve their resistance to corrosion and oxidation at temperatures as high as 1100° C.

One very effective technique for chromizing a superalloy workpiece in preparation for the aluminizing is as follows:

EXAMPLE XIV

A group of B-1900 jet engine blades was packed in a cup-shaped retort 4 inches high in an $NH_4Cl$-energized diffusion coating pack having 14% powdered chromium and 15% powdered $Ni_3Al$. The remainder of the pack was alumina, but can be any other inert material. The energizer content was ½% by weight of the total of the other pack ingredients. Chromizing was conducted in a hydrogen-bathed atmosphere, as in U.S. Pat. No. 3,764,371, with the retort loosely covered, holding a 1925° F. temperature for 20 hours, giving a very uniform chromized case about 0.7 mils deep, essentially free of oxide inclusions and without the formation of alpha-chromium phase.

In the event the $Ni_3Al$ content of the pack is omitted or is less than about 3% by weight, a substantial amount of oxide inclusions are formed in the case, and these may cause the case to spall off under the influence of repeated thermal shock treatment, particularly if their number increases to form a continuous layer of inclusions. Such inclusions tend to form in the chromium diffusion case of any superalloy containing aluminum and/or titanium. The number of such inclusions formed diminishes sharply when the $Ni_3Al$ content of the pack is at least 3% by weight, and reaches a minimum when the $Ni_3Al$ content is about 6%. As much as about 20% $Ni_3Al$ can be contained in the pack so that there is considerable tolerance for it and a wide concentration range for its use. It is preferred to use 8 to 15% of $Ni_3Al$ so as not to require accurate measuring and also to make it unnecessary to add make-up $Ni_3Al$ after each use of the chromizing pack.

In addition to reducing oxide inclusions, the $Ni_3Al$ behaves like an inert diluent in the pack since it does not interfere significantly with the chromizing. Thus the chromium content of the pack can be as low as 10% and as high as 40%, regardless of the $Ni_3Al$ content.

The formation of oxide inclusions during chromizing is also reduced when the chromizing takes place in an evacuated atmosphere as described for example in U.S. Pat. No. 3,290,126 granted Dec. 6, 1966. In an evacuated atmosphere the chromium content of the pack should be relatively high, e.g. from about 25 to about 60% by weight to keep the chromizing time from exceeding 30 hours, and the energizer should be a nonvolatile halide.

The foregoing reduction in oxide inclusion and alpha-chromium phase formation is also obtained when other nickel-base superalloys are substituted for the B-1900 alloy of Example XIV. Such alternative superalloys include any alloy having 50 to 75% nickel and a little aluminum or titanium. Also the Ni$_3$Al can be replaced by intermetallics ranging from Ni$_{3.5}$Al to Ni$_2$Al with equivalent results.

When chromizing the foregoing superalloys at atmospheric pressure or at somewhat above atmospheric pressure there is a tendency to form alpha phase chromium on the chromized superalloy workpiece even when the chromium pick-up is as low as 1 to 3 milligrams per square centimeter of surface. Such alpha phase formation is helpful in that after a subsequent aluminizing coated members have greater resistance to corrosion, as much as three or more times the resistance to corrosion in hot sulfidizing atmospheres. However the alpha chromium tends to be brittle and does not provide a good surface for receiving vapor-deposited top coatings such as that described in U.S. Pat. No. 3,676,085. By using a cup-shaped retort effectively not over 5 inches in height as described in Ser. No. 576,981, the formation of alpha chromium phase is prevented. Retort cups taller than 5 inches can be effectively used without alpha chromium formation by perforating the side wall of the retort at a level within 5 inches of its bottom. The perforations can be ⅛ inch diameter holes drilled through the retort wall to provide venting about 1 to 2 square inches in cross-sectional area for every pound of diffusion coating pack. Small holes such as those ⅛ inch in diameter generally do not permit any significant amount of the pack to spill out through them, but larger size holes can be used and covered by a wire screen when the retort is being loaded.

It is preferred to maintain an effective retort height of at least two inches, as by providing the foregoing venting at least two inches up from the bottom of the retort. It should also be noted that such venting is not to the air but to the space that surrounds the inner retort. That space is bathed by a stream of hydrogen, but can instead be bathed by a stream of inert gas like argon, during the chromizing. In general reduction in alpha phase formation is obtained with any chromium-diffusion pack and does not require the presence of any of the foregoing nickel aluminide intermetallics in the pack. However the presence of 3% or more of such intermetallic in the pack will even further reduce the tendency to form alpha chromium. Modifying Example XIV by replacing its retort with an unperforated retort cup 10 inches high will provide a chromized case about 1.5 mils thick with a substantial content of alpha phase chromium and suitable for subsequent aluminizing to make an excellent product that without further treatment has unusually good sulfidation resistance.

The diffusion aluminizing that follows the diffusion chromizing can be either an inhibited or uninhibited aluminizing. The uninhibited aluminizing is conducted with no more than a slight amount of chromium, or none at all, present in the aluminizing pack. A chromium content about half that of the aluminum, by weight, inhibits the aluminizing by greatly reducing the aluminum coating rate and is described for instance in U.S. Pat. No. 3,257,230. As pointed out in that patent, larger proportions of chromium to aluminum can also be used in the inhibited aluminizing, and proportions greater than 3:1 by weight cause some of the chromium to diffuse into the aluminized case along with the aluminum.

A very effective combination of the foregoing coatings is illustrated in the following example.

EXAMPLE XV

First hot stage jet engine vanes, some made of Rene 77 alloy and some of Rene 80 alloy were packed in a powder coating pack in a 10-inch high retort. The pack had the following composition, by weight:

| | |
|---|---|
| Very fine chromium (20 micron size or less) | 45% |
| Pre-fired mixture of | |
| 49.2 parts Al$_2$O$_3$ | |
| 42.8 parts Ni | |
| 6.5 parts Al | |
| 1.5 parts Cr | |
| | 55% |
| NH$_4$Cl energizer | 0.5% of the foregoing |

The entire pack had been prefired at 1925° F. for 5 hours and its energizer content brought up to the designated amount with fresh NH$_4$Cl.

After the packing is completed the retort is loosely covered and heated in a hydrogen-bathed atmosphere as described in Example XIV, to 1925°–1975° F. where it is kept for 10 hours. After cooling the workpieces are removed, cleaned as by lightly blasting with fine glass powder, and both alloys show a 1.5 mil thick diffusion coating case the outermost third of which is rich in alpha chromium. The thus-coated workpieces are then given an inhibited aluminizing treatment as described in Example I of U.S. Pat. No. 3,801,357, but without the masking there referred to. A 10-hour aluminizing carried out in that manner at 1950° F. produces a total diffusion coating case about 3 mils thick on the Rene 77 alloy and about 2.5 mils thick on the Rene 80 alloy. These coated members are unusually resistant to sulfidizing corrosion at temperatures of 1900° F.

The foregoing Rene alloys are nickel-base superalloys having the following approximate compositions in percent by weight:

| | Ni | Cr | Co | Mo | W | Al | Ti | C | B | Zr |
|---|---|---|---|---|---|---|---|---|---|---|
| Rene 77 | 58 | 14.6 | 15 | 4.2 | 0 | 4.3 | 3.3 | 0.07 | 0.016 | 0.04 |
| Rene 80 | 60 | 14.0 | 9.5 | 4. | 4.0 | 3. | 5.0 | 0.17 | 0.015 | 0.03 |

Similar results are also obtained with other nickel-based superalloys as well as with cobalt-based superalloys.

Chromium-inhibited aluminizing is particularly desirable as a top coating over a platinum diffusion or electroplated coating on nickel-base superalloys, and in such a combination provides greater sulfidation resistance at high temperatures than the use of the uninhibited aluminizing in such a combination as described in U.S. Pat. No. 3,677,789 granted July 18, 1972. The same advantage is obtained when other platinum metals, particularly palladium, are used in place of platinum. Additional suitable examples of chromium-inhibited aluminizing are described in Canadian Pat. No. 806,618 issued Feb. 18, 1969, as well as in U.S. Pat. No. 3,257,230. The nickel-base superalloys are also described in those patents and generally are those high temperature alloys which contain at least about 50% nickel and about 6 to 25% chromium.

The following coating illustrates this coating combination:

EXAMPLE XVI

A jet engine (hot section) blade of B-1900 alloy and electroplated with a 0.0003 inch thick layer of platinum was subjected to a hydrogen-bathed pack diffusion coating at 1890° F. for 12 hours, in a previously used pack consisting of, by weight:

| | |
|---|---|
| magnesothermic chromium powder | 45% |
| alumina (−325 mesh) | 45% |
| aluminum powder (−325 mesh) | 10% |
| activated with ½% NH$_4$Cl. | |

The thus treated blade has a 0.003 inch thick diffusion case and also shows exceptional hot sulfidation resistance.

Other types of very finely divided chromium less than 10 microns in size can be used in place of the magnesothermic powder in the foregoing example.

Similar hot sulfidation resistance is obtained for DS nickel if it is first chromized, as described in U.S. Pat. No. 3,785,854 for example, then given a thin platinum overcoating as by electroplating or vapor condensation, and then aluminized as also described in U.S. Pat. No. 3,785,854. Thus a 4 to 6 mil chromized case with a 0.2 to 0.3 mil platinum layer and a 1 mil inhibited aluminizing case makes a very effective coating combination for a DS nickel burner ring.

Figure 2:
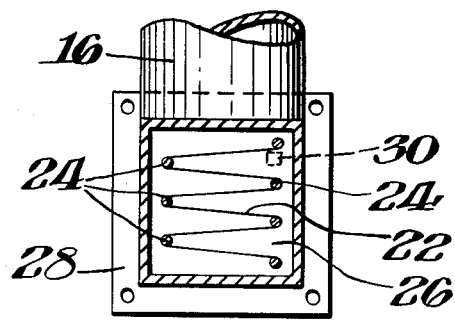
FIG. 2 is a sectional view of the construction of FIG. 1 taken along the line 2—2.

When pack diffusion coating a relatively small portion of a workpiece surface, as for instance to touch up a defective spot having an area up to about 10% of a prior coating in the manner shown in FIGS. 2 and 3 of U.S. Pat. No. 3,801,357 granted Apr. 2, 1974, the remaining surfaces can be kept from excessive deterioration through surface loss of critical alloying ingredients, by packing in an essentially inert pack containing a depletion-reducing amount of those critical ingredients as explained in U.S. Pat. No. 3,958,047.

Depletion of diffusible material from a workpiece surface can also be beneficial. As noted in U.S. Pat. No. 3,647,517 granted Mar. 7, 1972, aluminide coatings diffused onto the surface of cobalt-base superalloy workpieces are generally quite brittle, so that the protection provided by those aluminide coatings leaves something to be desired. However pretreating the workpieces so as to effect substantial diffusion depletion from those surfaces then causes an aluminide coating subsequently applied to be much less brittle.

The following is a typical example:

EXAMPLE XVII

A group of Mar-M-509 jet engine turbine vanes was packed in a plain carbon steel retort in a powder pack of equal parts by weight 325 mesh alumina and finely divided nickel the particles of which are about 40 microns in size. The pack is activated with about ½% by weight ammonium chloride and the retort so packed is heated in hydrogen to a temperature of 2,000° F. for 20 hours. The hydrogen atmosphere was provided as shown in U.S. Pat. No. 3,764,371.

At the completion of the heating the retort was permitted to cool and the cooled vanes removed from the pack. These vanes showed a weight loss of about 35 milligrams per square centimeter over their entire surface, and a typical cross section of a vane showed on microscopic examination a significant number of voids adjacent the surface that was in contact with the pack.

The resulting vanes were then given a chromium-inhibited aluminum diffusion coating from a diffusion coating pack in accordance with Example XVI, but with the maximum heating temperature at 2050° F. maintained for 20 hours. The final vanes had an aluminized case approximately 6 mils deep which exhibited unusually high resistance to impact damage. The same aluminizing carried out on a non-depleted Mar-M-509 vane provides an aluminized case only about 3 mils thick and very brittle.

The Mar-M-509 alloy is a well known cobalt-base superalloy and its composition is given in U.S. Pat. No. 3,647,517. Other cobalt-base alloys such as the additional five listed in Table 1 of the last-mentioned patent also lend themselves to this improved procedure for coating with an impact-resistance protective aluminide case. In each instance the depletion should provide a weight loss from about 3 to about 75 milligrams per square centimeter of surface. No scale is formed on the workpiece surface as a result of the depleting step, and the scale removal operation referred to in U.S. Pat. No. 3,647,517 is not needed.

Instead of nickel alone as the metallic ingredient of the depleting pack, alloys of nickel with aluminum for example can be used, although a proportion of aluminum larger than that in Ni$_3$Al is not desired. The nickel or nickel alloy can also be replaced by cobalt, and any of these metals can be present in the depleting pack in a proportion of from about 10 to about 90% by weight, the remainder of the pack being either alumina or any other inert diluent such as magnesia, to keep the metal particles from sintering together. It is preferred that the metal particles be no greater than about 200 microns in size.

The retort can be of steel, stainless steel or nickel-base alloys, and its composition does not seem to affect the process so along as it does not contain low melting metals such as zinc.

The pack activator can be any halide diffusion activator including ammonium iodide, ammonium bromide, ammonium bifluoride, elemental iodide or bromine, etc., and its content can be as low as ⅛th of 1% of the pack by weight. The depleting temperature to which the cobalt-base superalloy or pieces are subjected in contact with the pack can be as low as 1600° F. or as high as 2200° F., and the depleting times can be as little as 2 hours to as much as 100 hours, the longer times being used with the lower temperatures and vice versa.

Instead of hydrogen atmosphere during the depletion, the atmosphere can be of inert gas such as argon. The activator provides a halide vapor upon heat-up and such vapor accelerates the depletion in much the same manner as it accelerates the diffusion coating of workpieces.

The more impact-resistant aluminized cobalt-base superalloy vanes and the like made in the foregoing manner are particularly desirable for use in jet engines such as those in aircraft where these articles are subject to impact damage, and make long-lived first stage hot section vanes.

Nickel base superalloys also show the foregoing depletion when subjected to the foregoing diffusion depletion action, but protective diffusion aluminized cases on nickel base superalloys are not as nearly as brittle as those on cobalt base superalloys, so that the aluminizing of the depleted nickel base superalloys provides a case with only a little more impact resistance as compared with the aluminizing of untreated nickel base superalloys.

Obviously many modifications and variations of the present invention are possible in the light of the above teachings. It is therefore to be understood that within the scope of the appended claims the invention may be practiced otherwise than as specifically described.

What is claimed:

1. A self-supporting iron web that has a visibly active pyrophoric surface in the form of a three-dimensional micro-fissured fragmentation into cells principally ranging from about 500 Angstroms to about 5000 Angstroms in size, and produced by dissolving out from that surface a different metal introduced by low-temperature activated pack diffusion into the surface of a starting web not over 20 mils thick.

2. The combination of claim 1 in which the pyrophoric web is dry.

3. A self-supporting web of a stainless alloy of iron that has a metal surface in the form of a three-dimensional micro-fissured fragmentation into cells principally ranging from about 500 Angstroms to about 5000 Angstroms in size and produced by dissolving out from that surface a different metal introduced by lower-temperature activated pack diffusion into the surface of a starting web not over 20 mils thick and having catalytic activity.

* * * * *

UNITED STATES PATENT AND TRADEMARK OFFICE
CERTIFICATE OF CORRECTION

PATENT NO. : 4,292,208
DATED : September 29, 1981
INVENTOR(S) : Alfonso L. Baldi and Victor V. Damiano It is certified that error appears in the above-identified patent and that said Letters Patent are hereby corrected as shown below:

In the 3rd line of paragraph numbered "[63]" on the face page of the patent "4,157,705" should be --4,154,705--;
Column 1, line numbered 7, "4,157,705" should be --4,154,705--;
last line, "No." should be --Specification--;
Column 2, line 62, "foil" should be --foils--;
Column 7, line 49, "turn" should be --run--;
line 55, "incology" should be --Incoloy--;
line 60, "noted" should be --not--;
Column 8, line 16, "amoung" should be --among--;
Column 13, line 65, after "VII" insert --,and the substrates activated were no thicker than 20 mils--; and
Column 20, line 10, "lower" should be --low--.

Signed and Sealed this

Ninth Day of February 1982

[SEAL]

*Attest:*

*Attesting Officer*

GERALD J. MOSSINGHOFF

*Commissioner of Patents and Trademarks*